(12) United States Patent
Tatsushima et al.

(10) Patent No.: US 12,145,306 B2
(45) Date of Patent: Nov. 19, 2024

(54) MANUFACTURING METHOD FOR HIGH-PRESSURE TANK AND MANUFACTURING JIG FOR HIGH-PRESSURE TANK

(71) Applicant: HONDA MOTOR CO., LTD., Tokyo (JP)

(72) Inventors: Kosuke Tatsushima, Wako (JP); Toru Koseki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 269 days.

(21) Appl. No.: 17/678,993

(22) Filed: Feb. 23, 2022

(65) Prior Publication Data

US 2022/0314526 A1 Oct. 6, 2022

(30) Foreign Application Priority Data

Mar. 31, 2021 (JP) ................... 2021-059607

(51) Int. Cl.
*B29C 53/60* (2006.01)
*B29C 53/80* (2006.01)
*B29C 63/34* (2006.01)
*B29L 31/00* (2006.01)

(52) U.S. Cl.
CPC ........ *B29C 53/602* (2013.01); *B29C 53/8008* (2013.01); *B29C 63/341* (2013.01); *B29C 63/346* (2013.01); *B29L 2031/7156* (2013.01)

(58) Field of Classification Search
CPC .. B65D 88/128; B65D 88/748; B65D 85/675; B65D 85/671; B65D 2563/10; B65D 63/10; B29C 53/602; B29C 53/8008; B29C 63/341; B29C 63/346; B29C 70/30; B29C 70/54; B29L 2031/7156
See application file for complete search history.

(56) References Cited

U.S. PATENT DOCUMENTS

| | | | |
|---|---|---|---|
| 7,044,429 B1 * | 5/2006 | Foreman | B29D 11/00173 425/162 |
| 8,449,705 B1 * | 5/2013 | Rufer | B29C 53/587 220/591 |
| 2004/0182869 A1 * | 9/2004 | Kubo | F17C 11/005 220/581 |

(Continued)

FOREIGN PATENT DOCUMENTS

| CN | 112497721 A | 3/2021 |
|---|---|---|
| JP | 2010-276139 A | 12/2010 |

(Continued)

OTHER PUBLICATIONS

Office Action dated Jan. 21, 2024 issued in the corresponding Chinese Patent Application 202210175953.6 with the English machine translation thereof.

*Primary Examiner* — Kareen K Thomas
(74) *Attorney, Agent, or Firm* — Joseph P. Carrier

(57) ABSTRACT

A manufacturing method and a jig for a high-pressure tank includes a filament winding step in which a reinforcing shaft is inserted from a cap toward the other end of a liner, the axial length of the liner is fixed by the reinforcing shaft, and a fiber-reinforced resin is wound; and a thermal curing step in which the fixing of the reinforcing shaft to the other end of the liner is released so that the liner can change in the axial direction, and the fiber-reinforced resin is heated.

5 Claims, 4 Drawing Sheets

(56) References Cited

U.S. PATENT DOCUMENTS

| | | | |
|---|---|---|---|
| 2007/0205201 A1* | 9/2007 | Cundiff | F17C 1/06 |
| | | | 220/591 |
| 2009/0071965 A1 | 3/2009 | Iida et al. | |
| 2009/0314785 A1* | 12/2009 | Cronin | B29C 53/602 |
| | | | 156/305 |
| 2010/0032510 A1* | 2/2010 | Tanigawa | B29C 53/602 |
| | | | 242/430 |
| 2013/0049256 A1* | 2/2013 | Tani | F17C 1/06 |
| | | | 264/249 |
| 2013/0092311 A1* | 4/2013 | Kobayashi | B29C 35/02 |
| | | | 156/425 |
| 2013/0186597 A1* | 7/2013 | Clark | F28D 15/00 |
| | | | 165/157 |
| 2014/0096895 A1* | 4/2014 | Emori | F17C 1/02 |
| | | | 156/172 |
| 2015/0258740 A1* | 9/2015 | Kang | F16J 12/00 |
| | | | 264/312 |
| 2016/0109065 A1* | 4/2016 | Coors | F17C 1/00 |
| | | | 156/185 |
| 2016/0144560 A1* | 5/2016 | Emori | B29C 70/06 |
| | | | 156/172 |
| 2016/0339632 A1* | 11/2016 | Kato | B29C 70/32 |
| 2021/0078238 A1 | 3/2021 | Katano | |

FOREIGN PATENT DOCUMENTS

| | | |
|---|---|---|
| WO | 2006/132394 A1 | 12/2006 |
| WO | 2010/058451 A1 | 5/2010 |

* cited by examiner

MANUFACTURING METHOD FOR HIGH-PRESSURE TANK AND MANUFACTURING JIG FOR HIGH-PRESSURE TANK

CROSS-REFERENCE TO RELATED APPLICATIONS

This application is based upon and claims the benefit of priority from Japanese Patent Application No. 2021-059607 filed on Mar. 31, 2021, the contents of which are incorporated herein by reference.

BACKGROUND OF THE INVENTION

Field of the Invention

The present invention relates to a manufacturing method for a high-pressure tank for storing gas and a manufacturing jig for the high-pressure tank.

Description of the Related Art

A high-pressure tank is installed in a fuel cell vehicle (fuel cell automotive vehicle) as a device for storing high pressure hydrogen gas. This type of high pressure tank, as disclosed in WO 2010/058451 A1, is equipped with a liner, a reinforcing layer that reinforces the liner, and a cap having a flow path through which a gas is capable of flowing and which is joined to the liner. The reinforcing layer has a structure in which a fiber reinforced resin is wound around an outer surface of the liner. The fiber-reinforced resin is wound through a filament winding process.

In the filament winding process, the fiber-reinforced resin is wound around the outer surface of the liner while tension is applied to the fiber-reinforced resin in a state where internal pressure is applied to the liner. In this case, the overall length of the high-pressure tank may change depending on the balance between the inner pressure of the liner and the tension of the fiber-reinforced resin.

Thus, in the filament winding process of WO 2010/058451 A1, a reinforcing shaft penetrating the interior of the liner is fixed to the liner. This prevents a change in the overall length of the high-pressure tank.

SUMMARY OF THE INVENTION

However, the reinforcing layer formed in the filament winding process using the reinforcing shaft has a problem that residual stress is generated in the reinforcing layer in the thermal curing process that follows the filament winding process.

That is, the reinforcing shaft thermally expands during the thermal curing process to generate a force in the direction of axial expansion of the reinforcing layer and liner. When the fiber-reinforced resin constituting the reinforcing layer is cured in a state where a force from the reinforcing shaft is applied, residual stress may occur in the reinforcing layer. Also, the reinforcing layer of the high-pressure tank during thermal curing may undergo natural expansion and deformation. If natural expansion and deformation of the reinforcing layer is restricted by the reinforcing shaft, the fiber-reinforced resin may be cured while the compressive stress is being applied. Under some conditions, to the contrary, the fiber-reinforced resin may be cured while the expansion stress is being applied because contractive deformation of the fiber-reinforced resin during thermal curing is restricted by the reinforcing shaft.

Also, the internal pressure applied to the interior of the liner during the filament winding process cannot be removed before the thermal curing of the fiber-reinforced resin is completed. Therefore, it is difficult to remove the reinforcing shaft after the filament winding process. It is desired that the stress generation in the reinforcing layer can be suppressed in the thermal curing process performed after the filament winding process using the reinforcing shaft.

An object of the present invention is to solve the aforementioned problems.

One aspect of the following disclosure is a manufacturing method for a high-pressure tank including a liner having a filling space therein and a reinforcing layer provided on the outer peripheral portion of the liner, the method including: a step of inserting a reinforcing shaft through a first end portion and a second end portion of the liner, fixing the reinforcing shaft to the liner, and fixing the length of the liner in the axial direction with the reinforcing shaft; a filament winding step of winding a fiber-reinforced resin around the outer peripheral portion of the liner while keeping the interior of the liner pressurized; a step of releasing the fixed state between the reinforcing shaft and at least one of the first end portion or the second end portion of the liner, thereby allowing the liner to be deformed in the axial direction; and a thermal curing step of heating the fiber-reinforced resin in a state where the fixed state between the reinforcing shaft and the second end portion of the liner is released, an forming the reinforcing layer on the outer peripheral portion of the liner.

Another aspect is a manufacturing jig for a high-pressure tank having a liner having a filling space therein, a first cap joined to a first end portion of the liner, a second cap joined to a second end portion of the liner, and a reinforcing layer provided on the outer peripheral portion of the liner, the manufacturing jig including: a reinforcing shaft that is inserted into the first cap and the second cap to hermetically seal the interior of the liner; a first attachment that fixes the reinforcing shaft to the first cap; and a second attachment that fixes the reinforcing shaft to the second cap; wherein at least one of the first attachment or the second attachment is provided with a fixing mechanism that fixes the reinforcing shaft in a manner that the reinforcing shaft is capable of being unfixed.

Still another aspect is a manufacturing jig for a high-pressure tank having a liner having a filling space therein, a first cap joined to a first end portion of the liner, a second cap joined to a second end portion of the liner, and a reinforcing layer provided on the outer peripheral portion of the liner, the manufacturing jig including: a reinforcing shaft that is inserted into the first cap and the second cap to hermetically seal the interior of the liner; a first attachment that fixes the reinforcing shaft to the first cap; and a second attachment that fixes the reinforcing shaft to the second cap; wherein the reinforcing shaft comprises a first shaft fixed to the first attachment, a second shaft fixed to the second attachment, and a coupling mechanism that connects the first shaft and the second shaft in a manner that the first shaft and the second shaft are capable of being uncoupled.

According to the manufacturing method and manufacturing jig for the high-pressure tank of the above aspect, it is possible to suppress the occurrence of stress on the reinforcing layer in the thermal curing process performed after the filament winding process using the reinforcing shaft.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Hereinafter, preferred embodiments of the present invention will be described in detail with reference to the accompanying drawings.

First Embodiment

Figure 1:
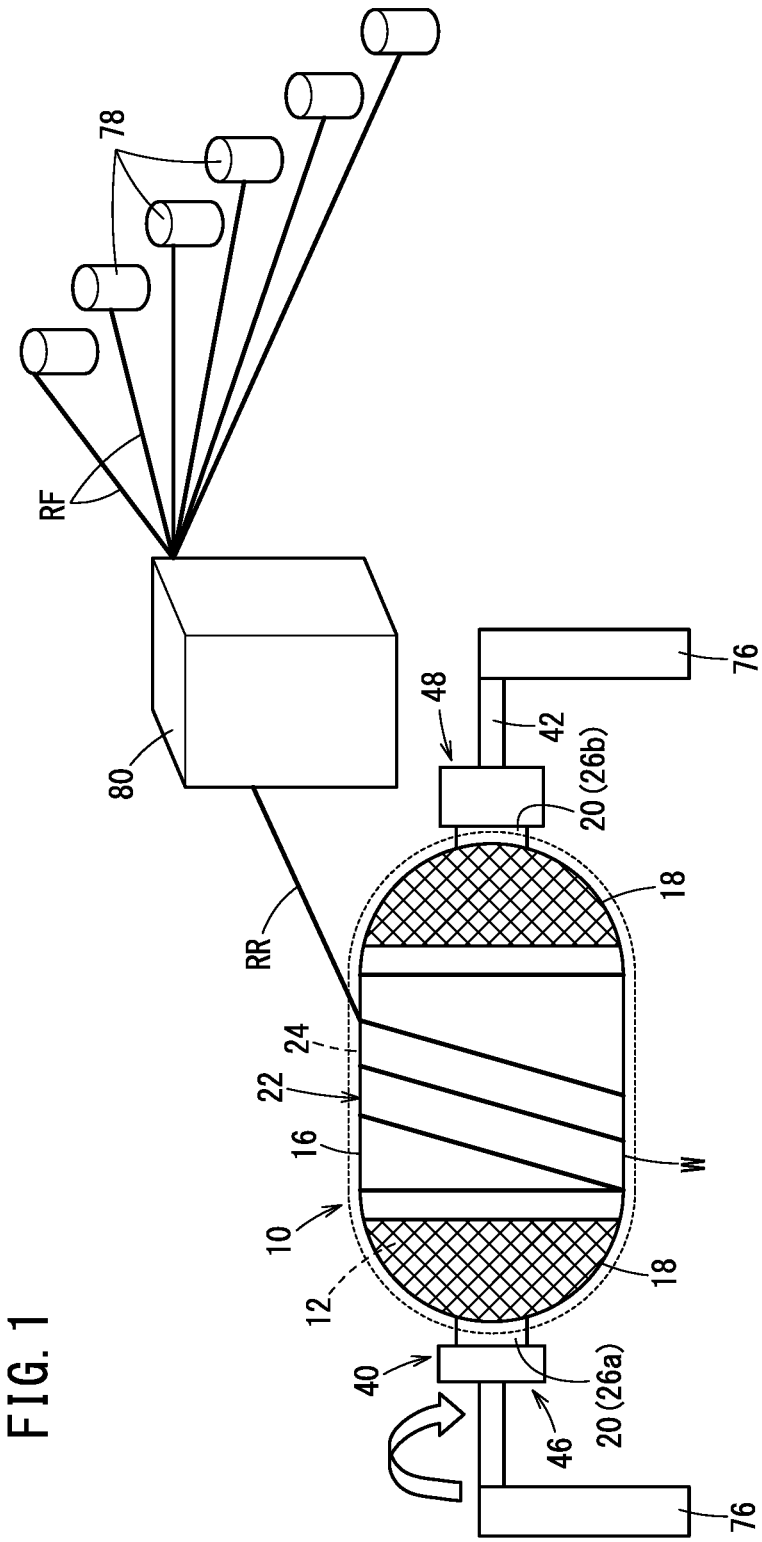
FIG. 1 is an explanatory view of a filament winding process according to the first embodiment.

As shown in FIG. 1, a high-pressure tank 10 according to the first embodiment of the present invention has a filling space 12 in which gas is compressed and stored. The high-pressure tank 10 is applied, for example, to a fuel cell system. The high-pressure tank 10 stores hydrogen gas (fuel gas, anode gas) as the gas. For example, the high-pressure tank 10 is installed in a fuel cell vehicle (not shown) and stores hydrogen gas supplied from a gas station. The high-pressure tank 10 supplies hydrogen gas to a fuel cell stack (not shown) when the vehicle is traveling or the like. The high-pressure tank 10 is not limited to the application to the fuel cell system. The high-pressure tank 10 can store gas other than hydrogen gas.

The high-pressure tank 10 has a cylindrical trunk portion 16 and a substantially hemispherical closing portion 18 that closes both ends of the trunk portion 16. The filling space 12 is formed inside the high-pressure tank 10. The high-pressure tank 10 has a dimension in such a way that the filling space 12 has an appropriate volume. The closing portion 18 at one end and the closing portion 18 at the other end of the high-pressure tank 10 have a port portion 20. The port portion 20 connects the outside of the high-pressure tank 10 and the filling space 12. The port portion 20 is a portion to be connected to other members (pipes and valves) of the fuel cell system.

The high-pressure tank 10 has a liner 22, a reinforcing layer 24, and caps 26a, 26b. The liner 22 has the filling space 12 inside. The reinforcing layer 24 covers the outer surface of the liner 22. The caps 26a, 26b constitute the port portion 20 and allow hydrogen gas to flow therethrough.

Figure 2:
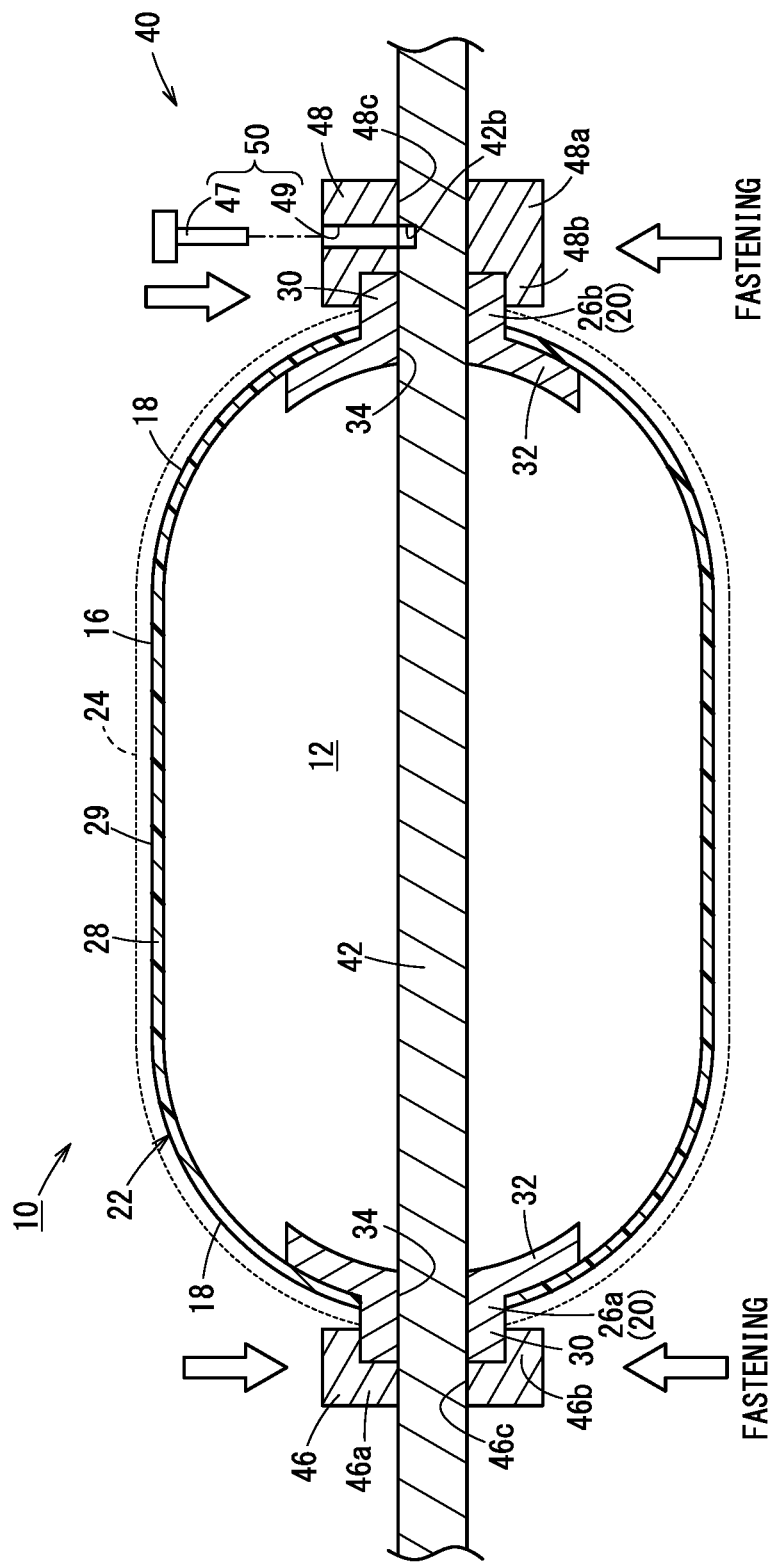
FIG. 2 is a cross-sectional view showing a state where a manufacturing jig for a high-pressure tank according to the first embodiment is attached to a liner.

As shown in FIG. 2, the liner 22 forms an inner layer (skeleton) of the high-pressure tank 10. The liner 22 has a body 28. One end of the body 28 is fixed to the cap 26a. The other end of the body 28 is fixed to the cap 26b. The liner 22 is integrally formed of a resin material (for example, a polyamide-based resin). Note that the liner 22 may have a structure in which a plurality of resin layers are laminated. In the illustrated example, the body 28 is integrally formed but is not limited to this structure. For example, the body 28 may have a structure in which two members having a joint portion at an axial intermediate portion of the trunk portion 16 are joined together.

The reinforcing layer 24 is directly laminated on an outer peripheral portion 29 of the body 28. The trunk portion 16 of the body 28 extends linearly in the axial direction. The closing portion 18 of the body 28 is smoothly curved radially inward from the trunk portion 16.

The reinforcing layer 24 constitutes an outer layer of the high-pressure tank 10. The reinforcing layer 24 covers the entire body 28 of the liner 22 and a portion of the caps 26a, 26b attached to the liner 22. As a material of the reinforcing layer 24, for example, a carbon fiber reinforced resin is preferably used. The reinforcing layer 24 is formed by the filament winding process and the subsequent thermal curing process. The filament winding process includes winding an uncured tape-like fiber-reinforced resin RR around the liner 22.

The first cap 26a is disposed at the closing portion 18 at one end of the high-pressure tank 10. The first cap 26a constitutes the port portion 20 for the hydrogen gas. The first cap 26a has a first member 30 protruding outside the liner 22 and a second member 32 disposed inside the liner 22. The first member 30 and the second member 32 are formed of a metal material. The first member 30 is formed in a cylindrical shape. The first member 30 has therein a through hole 34 penetrating through the first cap 26a. The second member 32 extends radially outward from the first member 30 in the form of a flange.

The outer diameter portion of the first member 30 has a shape to which other members (mouth valve) of the fuel cell system can be attached. In the manufacturing process of the high-pressure tank 10, a first attachment 46 of a manufacturing jig 40 to be described later is attached to the outer diameter portion of the first cap 26a.

The second cap 26b is disposed at the closing portion 18 at one end of the high-pressure tank 10. The second cap 26b is configured in the same manner as the first cap 26a.

As shown in FIG. 2, the filament winding process is performed in a state where the manufacturing jig 40 has been attached. The manufacturing jig 40 has a reinforcing shaft 42, the first attachment 46, and a second attachment 48. The reinforcing shaft 42 is attached so as to pass through one end and the other end of the liner 22. The first attachment 46 fixes the reinforcing shaft 42 to the first cap 26a. The second attachment 48 fixes the reinforcing shaft 42 to the second cap 26b.

The reinforcing shaft 42 is joined to the first attachment 46 and is integrated with the first attachment 46. The reinforcing shaft 42 is inserted into the interior of the liner 22 from the first cap 26a. The other end of the reinforcing shaft 42 extends through the interior of the liner 22 and protrudes from the second cap 26b. The reinforcing shaft 42 has a cylindrical shape having an outer diameter substantially equal to the inner diameter of the through holes 34 of the caps 26a and 26b. When the reinforcing shaft 42 is inserted into the caps 26a and 26b, the through holes 34 are hermetically sealed. That is, the reinforcing shaft 42 inserted into the caps 26a and 26b keeps the filling space 12 of the liner 22 in a pressurized state.

The reinforcing shaft 42 has, at a predetermined position, a fixing hole 42b for being fixed to the second attachment 48. The fixing hole 42b opens on the outer surface of the reinforcing shaft 42. The fixing hole 42b is formed to have a predetermined depth in the radial direction. The fixing hole 42b is formed at a position into which a lock pin 47 can be inserted. When the first attachment 46 is fastened to the first cap 26a, the lock pin 47 is inserted into the second attachment 48. The lock pin 47 will be described later. In place of the fixing hole 42b, the reinforcing shaft 42 may have a groove having a depth substantially equal to the depth of the fixing hole 42b. The groove is formed in an annular shape over the entire circumferential area of the reinforcing shaft 42.

The first attachment 46 has a body 46a and a fastening portion 46b protruding from an outer peripheral portion of the body 46a. The body 46a has at its center a shaft hole 46c through which the reinforcing shaft 42 passes. The reinforcing shaft 42 is joined to the shaft hole 46c by a method such as adhesion, fitting, or welding. The fastening portion 46b is provided with a fastening mechanism to be fastened to the outer diameter portion of the first member 30 of the first cap 26a. The first attachment 46 fixes the reinforcing shaft 42 to the first cap 26a via the fastening portion 46b.

The second attachment 48 includes a body 48a, a fastening portion 48b protruding from the outer peripheral portion of the body 48a, and the lock pin 47. An insertion hole 48c through which the reinforcing shaft 42 can be inserted is formed in the body 48a. The body 48a is movable in the axial direction of the reinforcing shaft 42 via the insertion hole 48c. The insertion hole 48c allows the second attachment 48 to rotate about the axis of the reinforcing shaft 42.

Further, the body 48a is formed with a lock hole 49 constituting a fixing mechanism 50 of this embodiment. The lock hole 49 is formed so as to pass through a side portion of the body 48a. The lock hole 49 is formed to have a cross-sectional dimension through which the lock pin 47 can be inserted. When the first attachment 46 is fastened to the first cap 26a and the second attachment 48 is attached to the second cap 26b, the lock hole 49 can communicate with the fixing hole 42b of the reinforcing shaft 42. By adjusting the circumferential position of the second attachment 48, the lock hole 49 and the fixing hole 42b of the reinforcing shaft 42 communicate with each other.

The lock pin 47 is a bar-like member inserted into the lock hole 49 and the fixing hole 42b. The lock pin 47 fixes the reinforcing shaft 42 and the second attachment 48 in the axial direction and the circumferential direction. Therefore, the reinforcing shaft 42 is fixed to the second cap 26b via the second attachment 48. That is, the lock pin 47 and the lock hole 49 constitute the fixing mechanism 50. The fixing mechanism 50 fixes the reinforcing shaft 42 and the second cap 26b in a manner that they can be unfixed. The lock pin 47 can be easily removed. When the lock pin 47 is removed, the fixing mechanism 50 releases the fixed state between the reinforcing shaft 42 and the second attachment 48 to release them. In the fixing mechanism 50, the lock pin 47 can be replaced with a plate-like member. When a groove is provided in place of the fixing hole 42b, the lock pin 47 is not limited to a bar-like member. Instead of the lock pin 47, the fixing mechanism 50 can use, for example, a clip-like member that can be inserted along the groove. In this case, the fixing mechanism 50 fixes two positions in the circumferential direction of the reinforcing shaft 42.

Hereinafter, a method of manufacturing the high-pressure tank 10 of the present embodiment will be described.

As shown in FIG. 1, in the method of manufacturing the high-pressure tank 10, the filament winding process is performed in a state where the liner 22 and the caps 26a, 26b have been assembled. Hereinafter, the liner 22 and the caps 26a, 26 may be collectively referred to as a workpiece W. In the filament winding process, the reinforcing layer 24 is formed by winding the fiber-reinforced resin RR around the outer surface of the workpiece W.

The filament winding process shown in FIG. 1 is performed in a state where the lock pin 47 shown in FIG. 2 has been inserted. That is, the filament winding process is performed in a state where the fixing mechanism 50 has fixed the reinforcing shaft 42 to the second cap 26b.

Prior to the filament winding process, the manufacturing jig 40 is attached to the workpiece W as shown in FIG. 2. First, the reinforcing shaft 42 is inserted into the workpiece W through the first cap 26a. The reinforcing shaft 42 is inserted from the first cap 26a through the second cap 26b. Thereafter, the first attachment 46 is fastened to the first cap 26a. Thus, the reinforcing shaft 42 is fixed to the first cap 26a. Thereafter, the reinforcing shaft 42 is made to pass through the insertion hole 48c of the second attachment 48. The reinforcing shaft 42 is fixed to the second cap 26b via the second attachment 48. Thereafter, the lock pin 47 is inserted into the lock hole 49 and the fixing hole 42b. In this way, the fixing mechanism 50 is put in a fixed state. The reinforcing shaft 42 is fixed to the first cap 26a and the second cap 26b.

Thereafter, fluid is introduced into the filling space 12 of the liner 22 through a gas flow path (not shown) (provided inside the reinforcing shaft 42 or the like). The fluid applies pressure to the liner 22 from the inside.

Then, as shown in FIG. 1, one end and the other end of the reinforcing shaft 42 are attached to rotating mechanisms 76. The rotating mechanisms 76 then rotate the liner 22 together with the reinforcing shaft 42. Then, the fiber-reinforced resin RR is wound around the rotating workpiece W. Reinforced fiber RF constituting the fiber-reinforced resin is supplied from one or more creels 78. The reinforced fiber RF is impregnated with a matrix resin in an impregnation portion 80 to be a fiber-reinforced resin RR.

In the process of winding the fiber-reinforced resin RR, a force for reducing or extending the total length of the workpiece W is exerted depending on the balance between the internal pressure of the liner 22 and the tension of the fiber-reinforced resin RR. In the manufacturing method of this embodiment, by fixing the reinforcing shaft 42 to the first cap 26a and the second cap 26b, it is possible to prevent a change in the overall length of the workpiece W.

After winding of the fiber-reinforced resin RR is completed, the reinforcing shaft 42 is removed from the rotating mechanism 76. Thereafter, as shown in FIG. 2, the lock pin 47 of the second attachment 48 is pulled out. When the lock pin 47 is pulled out, the fixing mechanism 50 undoes the fixed state between the reinforcing shaft 42 and the second attachment 48 to release them. Thus, the reinforcing shaft 42 is in a state of being not fixed to the second cap 26b.

Next, the workpiece W is carried into a heating furnace together with the reinforcing shaft 42. The heating furnace heats the workpiece W up to a predetermined temperature to cure the fiber-reinforced resin RR. The reinforcing shaft 42 is thermally expanded in the thermal curing process and expanded in the axial direction. Since the reinforcing shaft 42 is in a state of being not fixed to the second cap 26b, the reinforcing layer 24 can be cured in a state where a load is not applied to the fiber-reinforced resin RR. The reinforcing shaft 42 does not interfere with the natural expansion or contraction of the high-pressure tank 10 during the thermal curing. Thus, in the method of manufacturing the high-pressure tank 10 of the present embodiment, the reinforcing layer 24 can be formed while the occurrence of residual stress is suppressed.

Second Embodiment

Figure 3:
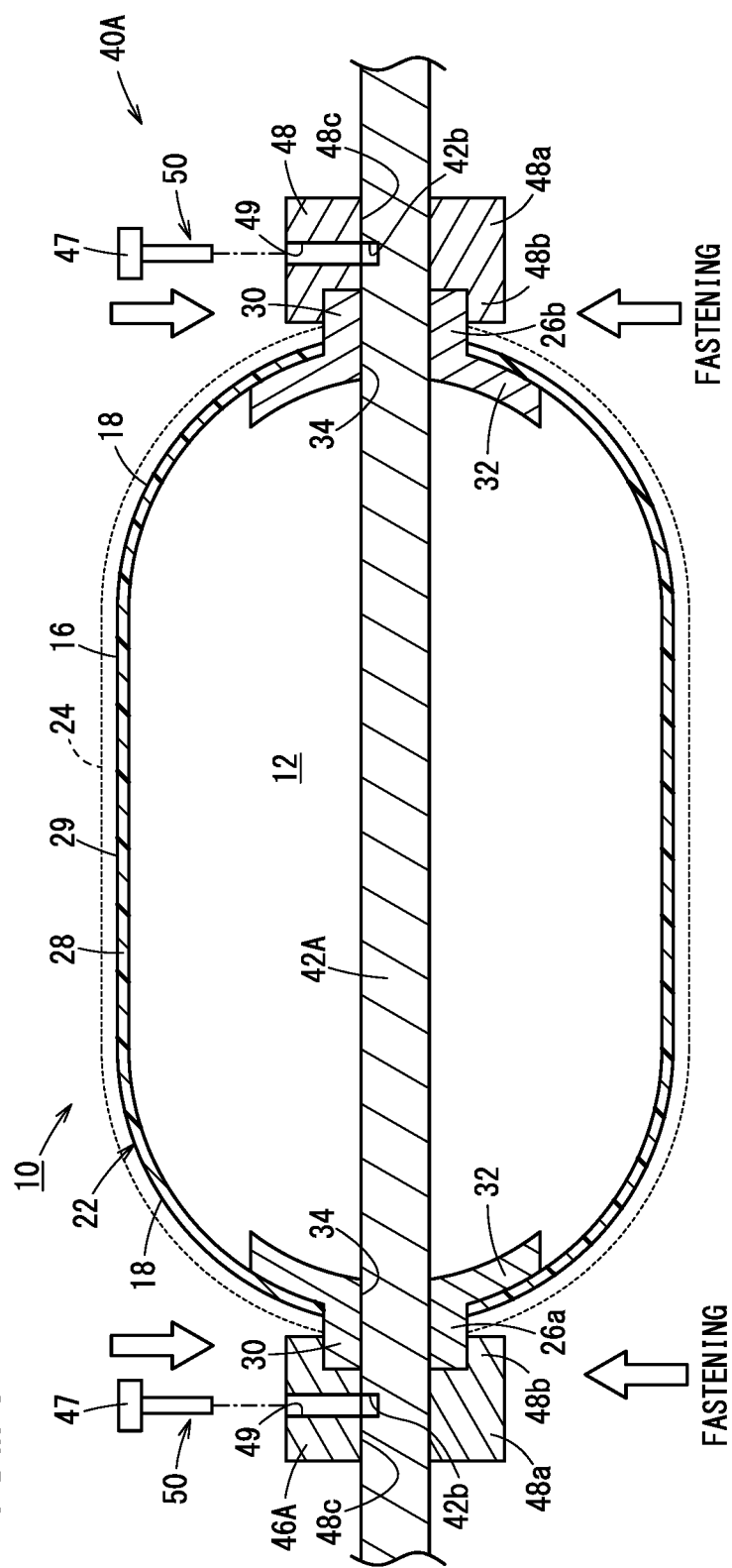
FIG. 3 is a cross-sectional view showing a state where a manufacturing jig for a high-pressure tank according to the second embodiment is attached to a liner.

In the present embodiment, a manufacturing jig 40A according to a modification of the manufacturing jig 40 described with reference to FIG. 2 is used. As shown in FIG. 3, the manufacturing jig 40A of the present embodiment has a first attachment 46A mounted on the first cap 26a. The first attachment 46A has the lock pin 47 and the fixing mechanism 50. A reinforcing shaft 42A is fixed to the first cap 26a via the fixing mechanism 50.

The reinforcing shaft 42A has the fixing hole 42b at a position where the reinforcing shaft 42A can engage with the lock pin 47. That is, the reinforcing shaft 42A uses two fixing mechanisms 50 for being fixed to the first cap 26a and to the second cap 26b. Since the other components of the manufacturing jig 40A are the same as those of the manufacturing jig 40 shown in FIG. 2, the same components are denoted by the same reference numerals and description thereof will be omitted. Also in this embodiment, the reinforcing shaft 42A may have a groove instead of the fixing hole 42b.

The method of manufacturing the high-pressure tank 10 using the manufacturing jig 40A is the same as that described with reference to FIG. 1. In the step of winding the fiber-reinforced resin RR in the filament winding process, the reinforcing shaft 42 is fixed with the fixing mechanisms 50 of both the first attachment 46A and the second attachment 48 in a fixed state. In the thermal curing process, the fixing mechanisms 50 of either one or both of the first attachment 46A and the second attachment 48 is released from the fixed state. The same effect as that of the manufacturing jig 40 can be obtained by the manufacturing jig 40A of this embodiment.

Third Embodiment

Figure 4:
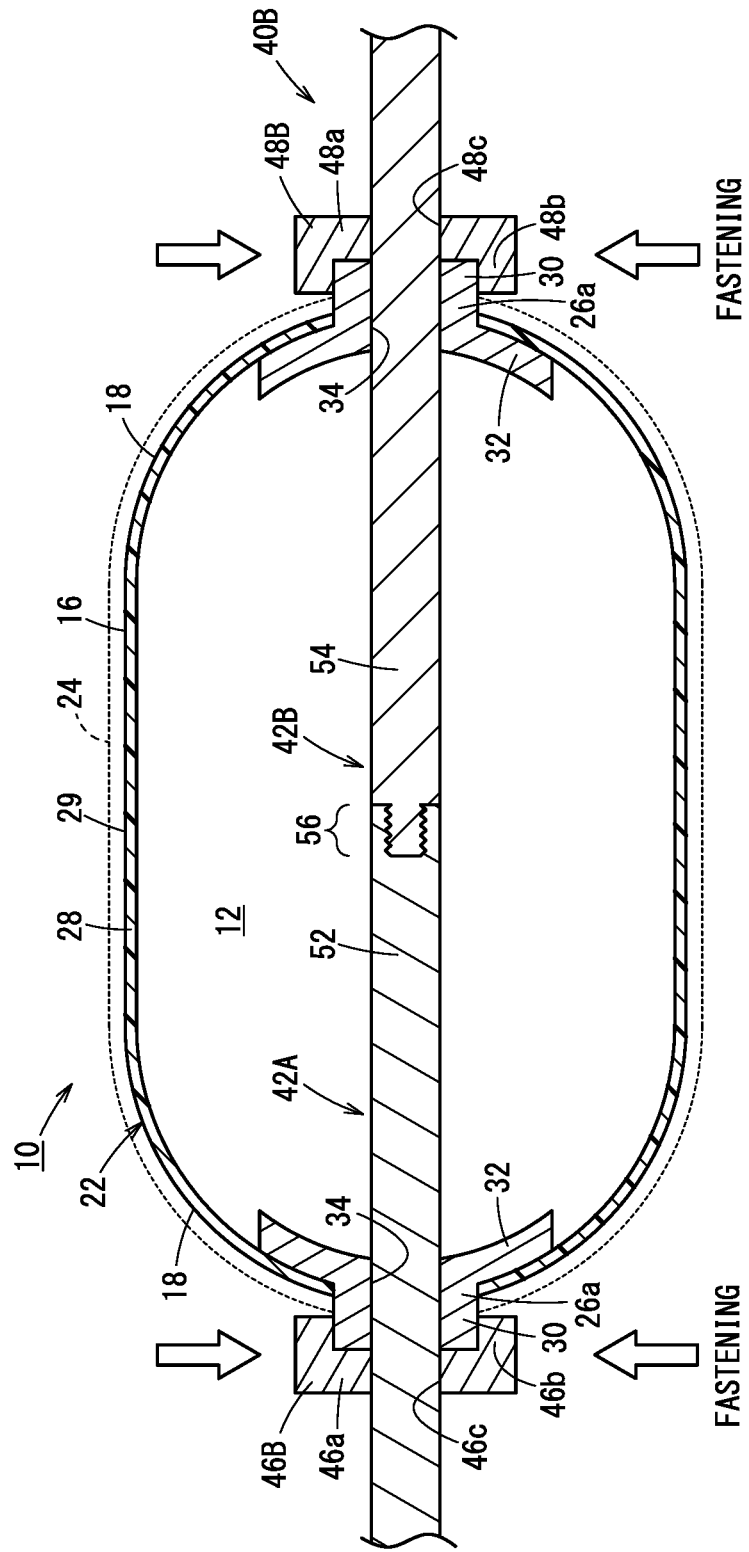
FIG. 4 is a cross-sectional view showing a state where a manufacturing jig for a high-pressure tank according to the third embodiment is attached to a liner.

In this embodiment, a further modification of the manufacturing jig 40 described with reference to FIG. 2 will be described. As shown in FIG. 4, in a manufacturing jig 40B of the present embodiment, a reinforcing shaft 42B includes a first shaft 52 and a second shaft 54. The first shaft 52 is fixed to the first cap 26a via a first attachment 46B, and the second shaft 54 is fixed to the second cap 26b via a second attachment 48B.

The first shaft 52 and the second shaft 54 are coupled to each other inside the liner 22 via a coupling mechanism 56. The coupling mechanism 56 is configured so as to be capable of releasing the coupling state by the input of an operating force from a portion of the first shaft 52 or the second shaft 54 projecting from the liner 22.

In this embodiment, the coupling mechanism 56 has a screw structure. By rotating the first shaft 52 and the second shaft 54 in predetermined directions relative to each other, the first shaft 52 and the second shaft 54 can be displaced in the axial direction. As a result, the fixed state of the positional relationship between the first cap 26a and the second cap 26b brought about by the reinforcing shaft 42B is released.

The first attachment 46B allows rotational movement of the first shaft 52. The second attachment 48B allows the rotational movement of the second shaft 54. When a certain amount of rotational force is input to the first shaft 52 and the second shaft 54, the first shaft 52 and the second shaft 54 rotate. Thus, the same effect as that of the manufacturing jig 40 can be obtained by the manufacturing jig 40B having the first shaft 52 and the second shaft 54 according to the present embodiment.

Hereinafter, effects of the manufacturing jigs 40, 40A, and 40B and a method of manufacturing the high-pressure tank 10 of the above-described embodiments will be described.

The manufacturing method for a high-pressure tank 10 according to one embodiment includes: a liner 22 having a filling space 12 therein, and a reinforcing layer 24 provided on the outer peripheral portion 29 of the liner 22; the method including: a step of inserting a reinforcing shaft 42 through a first end portion and a second end portion of the liner 22, fixing the reinforcing shaft to the liner 22, and fixing the length of the liner 22 in the axial direction with the reinforcing shaft 42; a filament winding step of winding a fiber-reinforced resin RR around the outer peripheral portion 29 of the liner 22 while keeping the interior of the liner 22 pressurized; a step of releasing the fixed state between the reinforcing shaft 42 and the second end portion (for example, a second cap 26b) of the liner 22, thereby allowing the liner 22 to be deformed in the axial direction; and a thermal curing step of heating the fiber-reinforced resin (RR) in a state in which the fixed state between the reinforcing shaft 42 and the second end portion of the liner 22 is released, and forming the reinforcing layer 24 on the outer peripheral portion 29 of the liner 22.

According to the manufacturing method described above, the constraint of the liner 22 in the overall length direction can be removed after the filament winding step. According to this manufacturing method, the filament winding process can be performed while preventing the deformation of the high-pressure tank 10. Further, this manufacturing method can realize both elimination of the risk of occurrence of residual stress in the thermal curing process and prevention of deformation of the high-pressure tank 10 in the filament winding process. Thus, variations in quality of the high-pressure tank 10 are suppressed, and reliability is improved. Further, according to this manufacturing method, since the residual stress can be reduced, the reinforcing layer 24 can be made thinner. Therefore, this manufacturing method can reduce the amount of the fiber-reinforced resin RR used and can reduce the manufacturing costs of the high-pressure tank 10.

According to the manufacturing method for the high-pressure tank 10, the high-pressure tank 10 includes a first cap 26a joined to the first end portion of a liner 22 and into which a reinforcing shaft 42 is inserted, and a second cap 26b joined to the second end portion of the liner 22 and into which the reinforcing shaft 42 is inserted, a first attachment 46, 46A, 46B that fixes the reinforcing shaft 42 to the first cap 26a is attached to the first cap 26a, and a second attachment 48, 48B that fixes the reinforcing shaft 42 to the second cap 26b is attached to the second cap 26b, the filament winding step is performed in a state in which the reinforcing shaft 42 is fixed at the first cap 26a and the second cap 26b, and the thermal curing step is performed in a state in which the fixed state of the reinforcing shaft 42 by the second attachment 48 is released. This manufacturing method also makes it possible to prevent deformation of the high-pressure tank 10 in the filament winding process and to eliminate the risk of generating residual stress in the thermal curing process.

In the manufacturing method for a high-pressure tank 10, the high-pressure tank 10 includes a first cap 26a joined to the first end portion of a liner 22 and into which a reinforcing shaft 42B is inserted, and a second cap 26b joined to the second end portion of the liner 22 and into which the reinforcing shaft 42B is inserted, the reinforcing shaft 42B includes a first shaft 52 that is inserted into the first cap 26a, a second shaft 54 that is inserted into the second cap 26b, and a coupling mechanism 56 that couples the first shaft 52 and the second shaft 54 in a manner that the first shaft and the second shaft are capable of being uncoupled, a first attachment 46B that fixes the reinforcing shaft 42B to the first cap 26a is attached to the first cap 26a, and a second attachment 48B that fixes the reinforcing shaft 42B to the second cap 26b is attached to the second cap 26b, the filament winding step is performed in a state in which the first shaft 52 and the second shaft 54 are coupled by the coupling mechanism 56, and the thermal curing step is performed in a state in which the connection between the first shaft 52 and the second shaft 54 coupled by the coupling mechanism 56 is uncoupled. This manufacturing method also makes it possible to prevent deformation of the high-pressure tank 10 in the filament winding process and to eliminate the risk of generating residual stress in the thermal curing process.

In the manufacturing method for the high-pressure tank 10 described above, the filament winding step and the thermal curing step are carried out by hermetically sealing the first cap 26a and the second cap 26b by the reinforcing shaft 42. With this manufacturing method, it is possible to prevent the liner 22 from being dented in the thermal curing process.

A manufacturing jig 40, 40A for a high-pressure tank 10 according to one embodiment includes a liner 22 having a filling space 12 therein, a first cap 26a joined to a first end portion of the liner 22, a second cap 26b joined to the second end portion of the liner 22, and a reinforcing layer 24 provided on an outer peripheral portion 29 of the liner 22, a reinforcing shaft 42 that in inserted into the first cap 26a and the second cap 26b to hermetically seal the interior of the liner 22, a first attachment 46, 46A that fixes the reinforcing shaft 42 to the first cap 26a, and a second attachment 48 that fixes the reinforcing shaft 42 to the second cap 26b, wherein at least one of the first attachment 46, 46A or the second attachment 48 is provided with a fixing mechanism 50 that fixes the reinforcing shaft 42 in a manner that the reinforcing shaft 42 is capable of being unfixed. According to the manufacturing jig 40, 40A, after the filament winding process, the constraint of the total length of the liner 22 can be removed through a simple operation. Therefore, the manufacturing jig 40, 40A can achieve both prevention of deformation of the entire length of the liner 22 in the filament winding process and elimination of the risk of occurrence of residual stress in the thermal curing process.

A manufacturing jig 40B for a high-pressure tank 10 according to another embodiment includes a liner 22 having a filling space 12 therein, a first cap 26a joined to a first end portion of the liner 22, a second cap 26b joined to the second end portion of the liner 22, and a reinforcing layer 24 provided on an outer peripheral portion 29 of the liner 22, a reinforcing shaft 42B that is inserted into the first cap 26a and the second cap 26b to hermetically seal the interior of the liner 22, a first attachment 46B that fixes the reinforcing shaft 42B to the first cap 26a, and a second attachment 48B that fixes the reinforcing shaft 42B to the second cap 26b, wherein the reinforcing shaft 42B includes a first shaft 52 fixed to the first attachment 46B, a second shaft 54 fixed to the second attachment 48B, and a coupling mechanism 56 that couples the first shaft 52 and the second shaft 54 in manner that the first shaft and the second shaft are capable of being uncoupled. Also with the manufacturing jig 40B, the constraint of the overall length of the liner 22 can be removed through a simple operation, so that the prevention of deformation of the overall length of the liner 22 in the filament winding process and the elimination of the risk of occurrence of residual stress in the thermal curing process can be achieved at the same time.

Although preferred embodiments of the present invention have been described above, the present invention is not limited to the above-described embodiments, and various modifications can be made without departing from the spirit of the present invention.

What is claimed is:

1. A manufacturing method for a high-pressure tank including a liner having a filling space therein, and a reinforcing layer provided on an outer peripheral portion of the liner, the method comprising:
   a step of inserting a reinforcing shaft through a first end portion and a second end portion of the liner, fixing the reinforcing shaft to the liner, and fixing a length of the liner in an axial direction with the reinforcing shaft;
   a filament winding step of winding a fiber-reinforced resin around the outer peripheral portion of the liner while keeping an interior of the liner pressurized;
   a step of releasing a fixed state between the reinforcing shaft and at least one of the first end portion or the second end portion of the liner, thereby allowing the liner to be deformed in the axial direction; and
   a thermal curing step of heating the fiber-reinforced resin, in a state, in which the fixed state between the reinforcing shaft and the second end portion of the liner is released, and forming the reinforcing layer on the outer peripheral portion of the liner.

2. The method according to claim 1, wherein the high-pressure tank includes a first cap joined to the first end portion of the liner and into which the reinforcing shaft is inserted, and a second cap joined to the second end portion of the liner and into which the reinforcing shaft is inserted,
   a first attachment that fixes the reinforcing shaft to the first cap is attached to the first cap, and a second attachment that fixes the reinforcing shaft to the second cap is attached to the second cap,
   the filament winding step is performed in a state in which the reinforcing shaft is fixed at the first cap and the second cap, and
   the thermal curing step is performed in a state in which a fixed state of the reinforcing shaft by the second attachment is released.

3. The method according to claim 2, wherein the filament winding step and the thermal curing step are performed in a state in which the first cap and the second cap are hermetically sealed by the reinforcing shaft.

4. The method according to claim 1, wherein the high-pressure tank includes a first cap joined to the first end portion of the liner and into which the reinforcing shaft is inserted, and a second cap joined to the second end portion of the liner and into which the reinforcing shaft is inserted,
   the reinforcing shaft includes a first shaft that is inserted into the first cap, a second shaft that is inserted into the second cap, and a coupling mechanism that couples the first shaft and the second shaft in a manner that the first shaft and the second shaft are capable of being uncoupled,
   a first attachment that fixes the reinforcing shaft to the first cap is attached to the first cap, and a second attachment that fixes the reinforcing shaft to the second cap is attached to the second cap,
   the filament winding step is performed in a state in which the first shaft and the second shaft are coupled by the coupling mechanism, and
   the thermal curing step is performed in a state in which the first shaft and the second shaft coupled by the coupling mechanism is uncoupled.

5. The method according to claim 3, wherein the filament winding step and the thermal curing step are performed in a state in which the first cap and the second cap are hermetically sealed by the reinforcing shaft.

\* \* \* \* \*